United States Patent [19]
Bock et al.

[11] 3,805,264
[45] Apr. 16, 1974

[54] INQUIRY-REPLY SYSTEM IN PARTICULAR SECONDARY RADAR DEVICE

[75] Inventors: Rudolf Bock, Schaftlach; Gerhard Wagner, Munich, both of Germany

[73] Assignee: Siemens Aktiengesellschaft, Berlin and Munich, Germany

[22] Filed: Oct. 30, 1970

[21] Appl. No.: 85,557

[30] Foreign Application Priority Data
Nov. 14, 1969 Germany............................ 1957303

[52] U.S. Cl................................ 343/6.5 R, 343/18 E
[51] Int. Cl................................................. G01s 9/56
[58] Field of Search ........................ 343/6.5 R, 18 E

[56] References Cited
UNITED STATES PATENTS
3,427,621  2/1969  Brunner.......................... 343/6.5 R Primary Examiner—T. H. Tubbesing
Attorney, Agent, or Firm—Hill, Sherman, Meroni, Gross & Simpson

[57] ABSTRACT

An inquiry-reply system utilizing a primary inquiry antenna which has a distinctive main lobe radiation pattern and less distinctive and smaller side lobes. An additional antenna is provided which has directional sensitivity arranged to be weakest in the area of the main lobe of the primary inquiry antenna and to be at a maximum in the vicinity of the side lobes of the antenna. False information is radiated by the additional antenna to disguise the inquiry code in the regions of the side lobes.

5 Claims, 5 Drawing Figures

INVENTORS
Rudolf Bock
Gerhard Wagner

INQUIRY-REPLY SYSTEM IN PARTICULAR SECONDARY RADAR DEVICE

BACKGROUND OF THE INVENTION

1. Description of the Prior Art

Prior art secondary radar devices have utilized inquiry antennas which have a distinctive main lobe as well as a number of side lobes which are smaller in configuration. In such systems it is desired only that replies from transponders be sent in response to information contained in the main lobe and that replies not be sent in response to side lobe information. One prior art arrangement to improve the distinctiveness of the main lobe over the side lobe has been to install an additional antenna such as an all-round antenna at the inquiry device which has a radiation diagram which is selected so as to enhance the signal information in the main lobe. Therefore reception devices can make a level comparison so as to exclude lower level information and thereby avoid replying to side lobe signals. However, such a level comparison arrangement involves evaluating matters of degree and a certain risk is involved that replies will be sent in response to side lobe information which may at times have a border line reception level.

2. Field of the Invention

The field of art to which this invention pertains is communication systems and in particular secondary radar systems utilizing inquiry and reply stations with the reply stations arranged to reply only to specific coded information.

SUMMARY OF THE INVENTION

It is an important feature of the present invention to provide an improved inquiry-reply communication device.

It is another feature of the present invention to provide means to prevent reply to inquiry information in the regions of the side lobes of the inquiry antenna.

It is a principal object of the present invention to provide an inquiry antenna with an additional antenna to mask the inquiry information in all areas except the region of the main lobe of the inquiry antenna.

It is another object of the present invention to provide an inquiry reply system as described above wherein the directional characteristics of the additional antenna are adapted to the radiation pattern of the inquiry antenna in the region of the side lobes.

It is also an object of the invention to provide an inquiry reply system as described above wherein the additional antenna is used to broadcast false information having the same frequency and pulse duration as the signals radiated by the inquiry antenna.

It is a further object of the present invention to provide an inquiry reply system as described above wherein the code of the additional antenna may be varied in accordance with a time schedule.

It is an additional object of the present invention to provide an inquiry reply system as described above wherein the additional antenna is constructionally secured to the inquiry antenna.

It is a further object of the present invention to provide a method of preventing unwanted decoding in an inquiry reply system utilizing an inquiry antenna and an additional antenna where the additional antenna transmits false information in the areas of the side lobes of the inquiry antenna to mask the inquiry information.

These and other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

BRIEF DESCRIPTION OF THE DRAWINGS

FIG. 1b illustrates the vertical diagram of such a pattern shown in FIG. 1a.

DESCRIPTION OF THE PREFERRED EMBODIMENT

The present invention is concerned with an inquiry-reply radar system in which an inquiry antenna has a main lobe radiation pattern as well as a number of side lobes. Inquiry signals are sent out from the inquiry antenna with a certain code distribution, and a reply is returned from the reply device in response to the inquiry signal.

According to the present invention, an additional antenna is provided which has a directional characteristic which is a minimum in the range of the main lobe of the inquiry antenna and which radiates signals which falsify the inquiry signals which appear in the vicinity of the side lobes.

Enemy detection devices which attempt to determine the inquiry code cannot derive any useful information in the areas of the side lobes, since the additional antenna falsifies information in this region. If the inquiry antenna is stationary, there is only a small angle of radiation within which the enemy detection devices could operate. Also, if the antenna is rotated there would only be a short time period during which enemy detection devices could operate, thereby greatly reducing the possibilities of interference or interception.

Figure 1A:
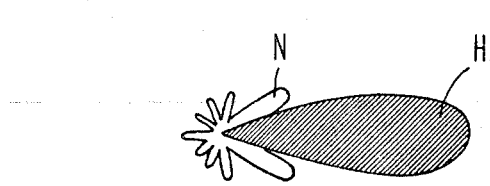
FIG. 1a illustrates the horizontal configuration of the radiation pattern of an inquiry antenna.
Figure 1B:
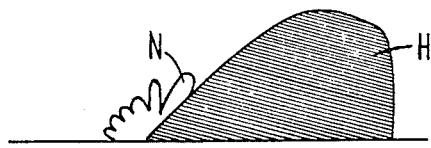

Referring to the drawings in greater detail, FIG. 1a shows a radiation pattern of an inquiry antenna. The main lobe is designated by the letter H, and the side lobes by the letter N. The largest side lobes are substantially smaller than the main lobe. The radiation diagram as shown in a vertical plane is illustrated in FIG. 1b and also illustrates that the main lobe H is substantially more significant than the side lobes N.

Figure 2:
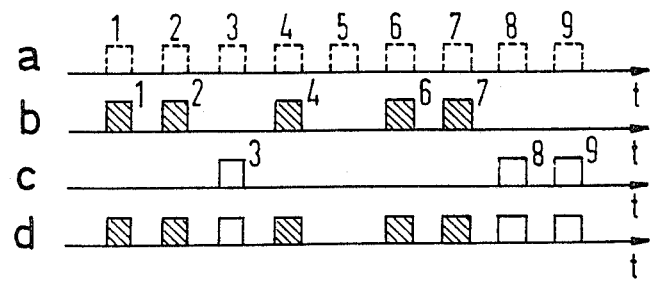
FIG. 2 shows various pulse diagrams which provide coded information for the inquiry and additional antennas.

In waveform a of FIG. 2, a series of pulses identified by the numerals 1 through 9 are supplied by a pulse generator to be used at the inquiry device. These are the pulses which are merely available and they are illustrated by dotted lines. In waveform a of FIG. 2, the pulses are shown to be equidistant and are also shown to have equal amplitudes.

Since the information radiated by the inquiry antenna is to be coded, some of the pulses shown in waveform a of FIG. 2 are utilized and others are suppressed such as for example in the coded pattern illustrated in waveform b of FIG. 2. In waveform b of FIG. 2, the first, second, fourth, sixth and seventh pulse is utilized. Accordingly an inquiry word code will be sent out according to waveform b of FIG. 2 and will be radiated by the inquiry antenna. These pulses are also radiated in the side lobe pattern and as such can provide means for enemy detection and analysis. This can be avoided if interfering pulses are radiated by means of an additional antenna which functions in the range of the side lobes N.

Figure 3:
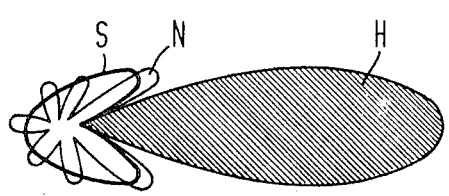
FIG. 3 shows the radiation diagram of an inquiry antenna together with the similar diagram of the additional antenna in the range of the side lobes of the inquiry antenna.

The radiation pattern of such an additional antenna is illustrated by the letter S in FIG. 3. This antenna has a zero pattern in the range of the main lobe H or at least a minimum in that range so that the inquiry code is not interfered with at the reply device. However, in the range of the side lobes N, a substantial interfering signal is radiated, and this is done in such a way as to make the inquiry information in those areas indistinguishable from the false information.

It is desirable if the interfering pulses from the additional antenna are derived from the same pulse generator as the inquiry pulses. An example of pulses derived in this manner are shown in waveform c of FIG. 2 where the pulses 3, 8 and 9 are derived from the available pulse source shown in waveform a of FIG. 2. It is these pulses 3, 8 and 9 which are radiated by means of the additional antenna. If possible, the radiation diagram of the additional antenna such as the diagram S in FIG. 3 is adapted to the shape of the diagram of the side lobes N or at least one of these side lobes.

In regions associated with the side lobes which have an inquiry signal present, there will also be a pulse distribution according to waveform c of FIG. 2 which when combined with the inquiry information results in a pulse distribution according to waveform d of FIG. 2. The information according to waveform d of FIG. 2 will not be received by the friendly reply devices since they do not correspond to the inquiry code.

Also, in those ranges of the side lobes N which have a substantially zero inquiry signal present, the signal which will appear will be the signal according to waveform c of FIG. 2 which, of course, is a false signal and which therefore will not convey the inquiry code information to an enemy detection device.

The additional signals which are radiated by the additional antenna preferably coincide with the type of inquiry signal used as shown in waveform b of FIG. 2. This is true both with regard to the frequency of repetition and with regard to the pulse length as well as with regard to any modulation of the signal. The radiated interfering signals or additional signals can fit into the code pattern of the inquiry signals if, for instance, a joint pulse generator is used.

Another advantage of using the same type pulses for both antennas is that a pulse word code may be scanned wherein the pulse word code is composed of both the inquiry code and the interfering code. Both codes would be coupled to the additional antenna, while only the inquiry code would be coupled to the inquiry antenna.

Another advantage of the present system is that by changing the inquiry codes from time to time, interference by enemy devices can be virtually eliminated since continuous analysis of the side lobes is necessary to determine the code being used.

It is also desirable to provide the same amount of information to be radiated by means of the additional antenna as is to be radiated by means of the inquiry antenna itself. It is also possible to change the level of the interfering signals from time to time to make it more difficult for enemy detection devices to decode the signals.

Figure 4:
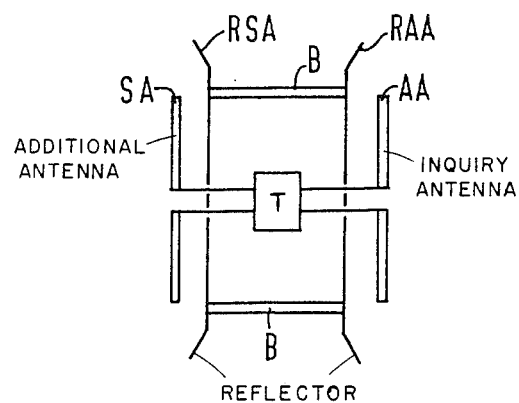
FIG. 4 illustrates an actual antenna arrangement showing the inquiry antenna and the additional antenna constructionally attached to one another.

In FIG. 4 an inquiry transmitter T is illustrated which is coupled to two antennas AA and SA. AA is the inquiry antenna which is connected to a reflector RAA. The additional antenna SA which sends out interfering signals in the region of the side lobes of the inquiry antenna AA is also provided with a reflector RSA. It is insured that the additional antenna SA reaches a zero point or minimum in the range of the main lobe of the inquiry antenna AA. The directional characteristic of the additional antenna SA can be adapted as well as possible to the characteristic of the side lobes of the inquiry antenna.

Means which are common in the antenna technology such as additional radiators, phase shifters and the like can be utilized in the system shown in FIG. 4. For this purpose it is desirable that the additional antenna as has been indicated by the members B be constructionally connected with the inquiry antenna AA. This is particularly important if the inquiry antenna AA is to be rotated or pivoted to assure the proper relationship of the radiation patterns as described in connection with FIG. 3. The radiation of the two antennas should preferably have the same polarization. Also, if the additional antenna SA is physically coupled to the inquiry antenna AA or to its mounting device, a second high frequency coupling can be avoided.

Another mode of operation is to select the signals which are radiated from the additional antenna in such a way that phase elimination of at least part of the inquiry signal occurs in the side lobes due to a phase cancellation principle. The additional or interfering signals must be selected so that they cannot be confused with the actual inquiry signal.

Falsifying the information in the area of the side lobes in systems utilizing modulation methods such as digital methods can be accomplished by using an all-round antenna which produces the same field strength as the largest minor lobe of the directional antenna. The all-round antenna has a phase shift of exactly 180° with respect to the valid code.

In this way, the all-round radiating antenna becomes dominant with regard to inquiries which are radiated by means of the minor lobes of the directional antenna. In such cases inquiries are not replied to by the transponder.

In normal cases of transmission, a certain number of faults are naturally present, and the present system of falsifying information bits must provide that at least a sufficiently large number of bits are to be eliminated before a reply will be withheld. In other words, the falsification must be outside of the normal tolerance of accuracy of the real inquiry signal. The interfering signal therefor must exceed a certain threshold level of suppression.

We claim as our invention:

1. A secondary radar interrogation answer system having an interrogation antenna with a main lobe and a number of side lobes, coded interrogation pulse signals being emitted via the interrogation antenna, an additional antenna having directional characteristics which include a minimum in the range of the main lobe and emitting signals additional to the coded interrogation signals, the impulses being emitted by the additional antenna being positioned within the time space of the coded interrogation signals and at intervals where no interrogation pulse is present whereby the signal outside the region of the main lobe is falsified.

2. An inquiry reply system in accordance with claim 1 wherein the directional characteristics of said additional antenna are adapted to the radiation pattern of said inquiry antenna in the region of the side lobes thereof.

3. An inquiry reply system in accordance with claim 1 wherein the additional antenna is constructionally secured to the inquiry antenna.

4. An inquiry reply system in accordance with claim 3 wherein the transmitter for the additional antenna is constructionally attached to the inquiry antenna.

5. An inquiry reply system in accordance with claim 1 wherein an inquiry antenna and the additional antenna have the same polarization.

* * * * *